United States Patent Office 2,845,409
Patented July 29, 1958

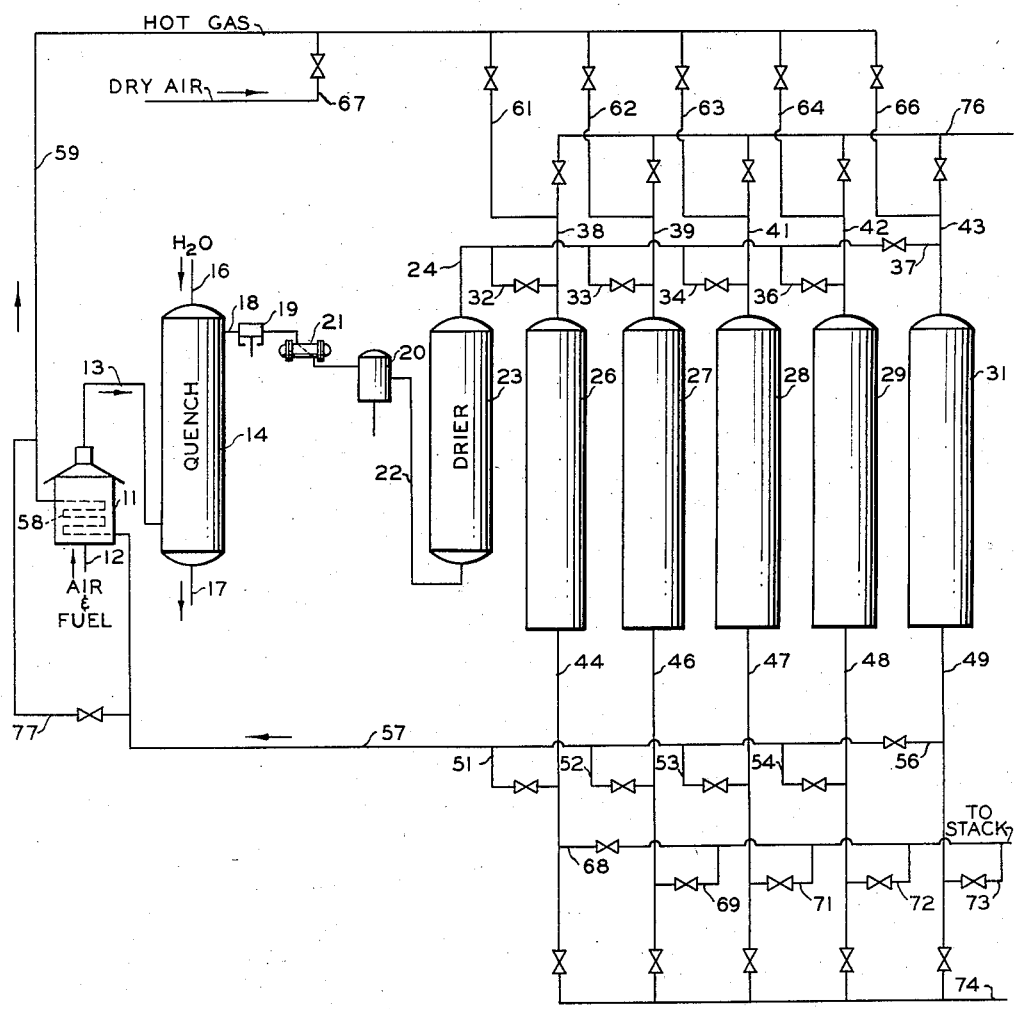

2,845,409

CATALYST REGENERATION

Edward N. Pennington and John E. Cottle, Bartlesville, Okla., assignors to Phillips Petroleum Company, a corporation of Delaware Application September 18, 1953, Serial No. 380,982

13 Claims. (Cl. 260—93.1)

This invention relates to a process and apparatus for the regeneration of catalysts on which combustible deposit has accumulated in a conversion process operated at a temperature substantially below the temperature of regeneration by burning off the combustible deposit. A specific aspect of the invention is concerned with the regeneration of chromium oxide-containing catalyst masses which have been utilized in the polymerization of olefins at relatively low temperatures.

Some catalysts lose activity when exposed to water vapor and it is therefore essential to avoid contact of the catalyst with water vapor during the regeneration process as well as during the conversion process in which the catalyst is utilized. Certain catalytic processes are operated at temperatures which are relatively low compared to the temperature at which the catalyst is regenerated by burning off combustible deposit with an oxygen-containing gas. In such processes it is essential to heat up the catalyst to combustion-supporting temperature and cool it down, after regeneration, to reaction temperature in contact with dry gas. We have devised a simple and highly efficient process for regeneration of a water-vapor-sensitive catalyst which effects considerable economy in the heat requirements of such a process.

The invention has a number of objects which include, providing a simple and economical process and arrangement of apparatus for regeneration of a catalyst mass which is sensitive to water vapor; providing an improved process for the regeneration of catalysts contaminated with combustible deposit; providing a combination process and an arrangement of apparatus for polymerizing olefins in contact with chromium oxide-containing catalyst in a series of separate reactors and regeneration of catalyst after it has become contaminated with combustible deposit; and providing an improved method of operating a series of catalyst cases in service in a cycle of alternate conversion at relatively low temperature and regeneration at a relatively high temperature. Other objects of the invention will become apparent from consideration of the accompanying disclosure.

In accordance with the invention, a mixture of air and fuel is burned in a furnace or combustion chamber so as to produce a combustion gas suitable for use in bringing the catalyst up to regeneration temperatures such as a temperature in the range of 850–1150° F. The hot combustion gas from the furnace is quenched or otherwise cooled and is thereafter dried by any suitable method, such as contact with a desiccant, and the dry, cool gas is passed through a reactor containing a catalyst mass which has just been regenerated at an elevated temperature by burning off combustible deposit with combustion gas containing a minor amount of air. The catalyst case is cooled down to approximately reaction temperature and the partially heated effluent gas from the catalyst case is passed to the furnace where it is heated by indirect heat exchange with the hot gases of the furnace to a temperature above regeneration temperature, or at least to a temperature which supports combustion of the deposit on the catalyst when a minor proportion of air is added to the combustion gas. The stream of hot combustion gas is then passed to a second catalyst case which contains a catalyst contaminated with combustible deposit and ready for regeneration. In passing through the catalyst case, the hot combustion gas raises the temperature of the catalyst mass therein to a combustion-supporting temperature and dry air from any suitable source is introduced to the combustion gas stream prior to the introduction of the combustion gas to the catalyst case to be regenerated. If desired, the dry air may be admixed with the combustion gas during the heating step, prior to burning off the combustible deposit, but it may be more desirable, in some cases, to admix dry air with the hot combustion gas only during the actual burning operation.

When operating in this manner, the catalyst mass in active condition is not contacted with gas containing an appreciable concentration of water vapor. During the burning step, water formed by combustion passes only through that part of the catalyst mass which has not been regenerated, due to the fact that the burning operation takes place in a restricted zone which begins in the section of the catalyst mass where the hot oxygen-containing gas first enters the chamber and the burning zone or flame front progresses through the mass toward the effluent end of the same. The clean, regenerated catalyst is therefore contacted only with hot, dry combustion-supporting gas which is fed to the reactor. The moisture-containing regeneration gas is vented from the system.

The invention is applicable to the regeneration of all types of catalysts which are deactivated or poisoned by contact with water vapor and is particularly effective where the regeneration temperature is considerably higher than the conversion temperature. A specific application of the invention is to the regeneration of chromium oxide-containing catalyst, particularly when deposited upon supports comprising silica in combination with alumina, titania, and/or zirconia, when utilized in the polymerization of olefins at temperatures in the range of about 150 to 450° F. This type of polymerization is fully disclosed in the application of J. P. Hogan and Robert L. Banks, Serial No. 333,576, filed January 27, 1953, now abandoned. During the polymerization process, combustible deposits, including solid polymer, accumulate on the catalyst and eventually reduce or mask the activity of the same so that removal of the deposit is required. This may be effected by contacting the catalyst mass with an oxygen-containing gas under combustion conditions in the conventional manner. In view of the fact that the polymerization process is performed at temperatures in the range of about 150 to 450° F., it is necessary to raise the temperature of the catalyst mass in any given reactor to at least 800 or 850° F. in order to initiate combustion of the deposit. The invention provides a simple and effective method of raising the catalyst mass to combustion temperature and cooling the same down to conversion temperature without contacting the regenerated catalyst with water vapor. Economy in heating and drying requirements is one of the outstanding advantages of the invention, particularly when the olefin feed contains 1-olefins having a maximum monomer chain length of eight carbon atoms and no branching nearer the double bond than the four position. Such a process produces tacky to solid polymer and considerable combustible deposit on the catalyst mass. The process is operated at superatmospheric pressures, usually in the range of 300–800 p. s. i., so as to maintain the olefin and diluent in liquid phase. We prefer to regenerate the catalyst at low superatmospheric pressures, usually in the range of 25–150 p. s. i. In a specific application of the invention, the catalyst cases are operated on stream at a temperature of about 340° F. and the regeneration is conducted at a temperature of approximately 950° F. A suitable regeneration temperature may be selected in the range of about 850–1150° F., however. The catalyst cases on stream are maintained under a pressure of 400 p. s. i. g., while the cases under regeneration are maintained at a pressure of 85 p. s. i. g. A plant utilizing seven reactors is particularly advantageous as three may be constantly maintained on stream, three on regeneration, and one on catalyst charge, reactivation, or replacement. Of the three cases on regeneration, one is on the burning operation, another is on cooling down to conversion temperature, and a third is on heating up to the burning temperature. After repeated on-stream and regeneration service, a catalyst mass requires replacement or reactivation and one case will be on this process at regular intervals.

For a more complete understanding of the invention, reference may be had to the drawing which is a schematic flow of one embodiment of the invention. Air and fuel are introduced to a furnace 11 via line 12 and the fuel is burned in the furnace to produce combustion gas for the process. The resulting combustion gas is passed via line 13 to a quench tank 14 where it is cooled by direct contact with water introduced through line 16. Aqueous effluent from the quench tank is removed through line 17. The cooled effluent gas from quench tank 14 passes through line 18 to a compressor 19, which compresses the gas and passes the same to a condenser 21, which reduces the temperature of the gas before passing the cooled effluent to knock-out drum 20 for removal of water. The cooled, compressed gas is passed via line 22 to a drier 23 which reduces the moisture content of the gas to a low concentration which is not deleterious to the catalyst mass. Drier 23 may suitably contain any efficient desiccant such as bauxite or adsorbent aluminum oxide from any other suitable source. Silica gel is also a good drying agent which may be utilized in drier 23. The cooled, dry gas is passed via line 24 to any one of reactors 26, 27, 28, 29, and 31 by means of valved lines 32, 33, 34, 36, and 37, which connect with reactor lines 38, 39, 41, 42, and 43, respectively.

Effluent cooling gas leaves the reactors through reactor lines 44, 46, 47, 48, and 49 and is passed by means of valved lines 51, 52, 53, 54, and 56 to return line 57 leading to furnace 11 and heating coil 58 therein, which serves to heat the relatively cool combustion gas and provide a hot, dry combustion gas stream to bring the catalyst cases up to combustion temperature. The hot combustion gas passes via line 59 to valved branch lines 61, 62, 63, 64, and 66, which connect with reactor lines 38, 39, 41, 42, and 43, for delivery of the hot combustion gas to the particular reactor to be placed on regeneration. Dry air from any suitable source is introduced to line 59 through valved line 67.

When a catalyst case is on regeneration under heating or burning conditions, the effluent is passed from the reactor lines 44, 46, 47, 48, and 49 to stack by means of valved lines 68, 69, 71, 72, and 73 for suitable disposal or use. The feed to the cases on stream is passed to the reactors through lines 44, 46, 47, 48, and 49 via feed line 74 and the reaction effluent is recovered in line 76, which connects with valved lines 38, 39, 41, 42, and 43.

Valved line 77 connects line 57 with line 59 and provides for recycling of cooling gas in order to facilitate temperature control of a catalyst case being cooled down to reaction temperature.

The arrangement of apparatus shown in the drawing is not the only arrangement of apparatus in which the process of the invention can be readily performed, but it illustrates the type of apparatus which is useful in performing the process of the invention. Various modifications of the process and apparatus disclosed are within the scope of the invention.

We claim:
1. A process for regenerating a plurality of catalyst masses in use in a conversion process which is operated at a substantially lower temperature than the temperature of regeneration, under conditions which cause contamination of the catalyst with combustible deposit and in which contact of the regenerated catalyst with moisture is deleterious to the catalyst, which comprises the steps of: (1) contacting one of the contaminated masses in an enclosed zone with a dry mixture of hot combustion gas and air under combustion conditions so as to burn said deposit from said catalyst, whereby the temperature of the catalyst is raised to a temperature substantially above conversion temperature; (2) burning fuel in an enclosed combustion zone to form combustion gas; (3) cooling said combustion gas to a temperature at least as low as said conversion temperature; (4) drying said combustion gas; (5) contacting the hot regenerated catalyst with the resulting cooled dry combustion gas so as to reduce the temperature of the catalyst to substantially reaction temperature; (6) heating the effluent gas from step (5) in indirect heat exchange with the hot combustion gas formed in step (2) to provide a stream of hot, dry combustion gas; (7) contacting another of said catalyst masses, which is ready for regeneration, with the hot gas from step (6) so as to bring the same up to regenerating temperature; and (8) contacting the thus heated mass with air in admixture with the hot combustion gas under combustion conditions so as to burn off combustible deposit from said heated mass.

2. The process of claim 1 in which step (3) comprises quenching the combustion gas by direct contact with water, compressing the quenched gas, and cooling the compressed gas by indirect heat exchange with a coolant so as to condense water contained therein before passing the cooled gas to step (4).

3. The process of claim 1 in which heating step (6) is effected in the same zone as step (2).

4. The process of claim 1 in which step (4) is effected by contacting the combustion gas with a suitable desiccant.

5. A process for regenerating a plurality of catalyst masses comprising chromium oxide deposited on a support, said catalyst masses being disposed in separate conversion zones in which a conversion process is effected at a temperature substantially below regeneration temperature under conditions which deposit combustible deleterious material on the catalyst, and said catalyst being deleteriously affected by water vapor, which process comprises the steps of: (1) contacting one of said masses containing combustible deposit with dry combustion gas so as to raise the temperature of the mass to combustion temperature for said deposit; (2) continuing the contacting of step (1) in the presence of dry air so as to burn off said deposit; (3) burning fuel in an enclosed combustion zone to form combustion gas; (4) cooling said combustion gas to a temperature at least as low as said conversion temperature; (5) drying said combustion gas; (6) contacting the hot regenerated catalyst with the resulting cooled dry combustion gas so as to reduce the temperature of the catalyst substantially to conversion temperature; (7) heating the effluent gas from step (6) in indirect heat exchange with the hot combustion gas formed in step (3) to provide a stream of hot dry combustion gas; (8) contacting another of said catalyst masses, which is ready for regeneration, with the hot gas from step (7) so as to bring the same up to regenerating temperature; and (9) contacting the thus heated other mass with air in admixture with the hot combustion gas under combustion conditions so as to burn off deposit from said other catalyst mass.

6. In a process comprising polymerizing an olefin feed in a plurality of separate zones in contact with catalyst masses comprising chromium oxide deposited on at least one member of the group silica and alumina at a temperature in the range of 150 to 450° F., thereby depositing combustible deposit on said catalyst, the improvement comprising the following steps: (1) when one of said masses has accumulated substantial deposit, contacting same with dry, hot combustion gas so as to raise its temperature to a combustion-supporting temperature; (2) contacting the resulting hot catalyst mass with dry air admixed with said combustion gas so as to burn off said deposit at a temperature in the range of 850 to 1150° F. and regenerate said catalyst; (3) burning fuel in an enclosed combustion zone to form combustion gas; (4) cooling said combustion gas at least to the polymerizing temperature utilized and drying same; (5) contacting the hot regenerated catalyst with the resulting cool, dry gas so as to reduce the temperature of the catalyst to approximate polymerizing temperature; (6) heating the effluent gas from the preceding step to combustion-supporting temperature by indirect heat exchange with the combustion gas formed in step (3); (7) contacting a second catalyst mass in said series with the hot gas from step (6) so as to bring same up to regenerating temperature; and (8) contacting the heated second catalyst mass with air in admixture with the hot combustion gas from step (6) under combustion conditions so as to burn deposit off said second catalyst mass.

7. The process of claim 6 in which said olefin feed comprises at least one 1-olefin having a maximum monomer chain length of eight carbon atoms and no branching nearer the double bond than the 4-position and in which a tacky to normally solid polymer is produced.

8. The process of claim 6 in which step (4) comprises quenching the combustion gas with a direct water quench, compressing the quenched gas, and cooling the compressed gas by indirect heat exchange with a coolant so as to condense water contained therein and thereafter contacting the cooled gas with a desiccant.

9. The process of claim 6 in which the catalyst comprises chromium oxide deposited on silica-alumina.

10. An arrangement of apparatus for effecting a catalytic conversion process and regeneration of the catalyst, which comprises in combination, a plurality of reactors having valved lines connected therewith for separately introducing feed and withdrawing reaction product; a furnace having an indirect heat exchanger therein, a fuel and air line leading to said furnace, and an effluent combustion gas line leading therefrom which is connected separately to each of said reactors at the inlet end by means of valved lines; a quencher and a dryer downstream thereof in said effluent combustion line; valved lines connected with each of the opposite ends of said reactors and with a line leading to said heat exchanger; an effluent line connected with said heat exchanger and with each of said reactors at the inlet end by means of valved lines; and an air line connected to said effluent line from said heat exchanger.

11. The apparatus of claim 10 in which said quencher is a direct water quencher and which includes a compressor and a condenser downstream thereof in that order but upstream of said dryer.

12. In a process in which a carbonaceous material is chemically converted in a plurality of separate zones by contacting with a catalyst which is deleteriously effected by contact with water vapor and, during said conversion, carbonaceous material is deposited on the surface of said catalyst, said conversion being conducted at a conversion temperature substantially below a regeneration temperature produced as subsequently described, the improvement comprising regenerating said catalyst by the following steps, in combination: (1) heating said catalyst, to a temperature sufficient to initiate combustion of said deposits, by contacting said catalyst with a hot, dry gas produced as subsequently described; (2) effecting combustion of said deposits on the heated catalyst at said regeneration temperature, by contact with an oxygen-containing gas; (3) separately producing a combustion gas by combustion of a fuel; (4) cooling said combustion gas at least to said conversion temperature; (5) removing substantially all of the water content from said combustion gas; (6) contacting the resulting cooled dry combustion gas from step (5) with the catalyst regenerated as described in step (2), thereby cooling said catalyst at least to said conversion temperature; and (7) indirectly heating the gas effluent from step (6) by heat of combustion produced in step (3) to provide the hot, dry gas for step (1).

13. A process according to claim 12 wherein said conversion temperature is within the range 150 to 450° F. and said regeneration temperature is within the range 850 to 1150° F.

References Cited in the file of this patent

UNITED STATES PATENTS

| | | |
|---|---|---|
| 2,231,231 | Subkow | Feb. 11, 1941 |
| 2,266,095 | Thayer | Dec. 16, 1941 |
| 2,310,244 | Lassait | Feb. 9, 1943 |
| 2,344,770 | Gunness | Mar. 21, 1944 |
| 2,404,788 | Burk | July 30, 1946 |
| 2,406,112 | Schulze | Aug. 20, 1946 |
| 2,470,166 | Hetzel | May 17, 1949 |
| 2,702,288 | Hoeksema et al. | Feb. 15, 1955 |
| 2,728,754 | Evering et al. | Dec. 27, 1955 |